(12) United States Patent
Ludeman

(10) Patent No.: US 6,665,398 B1
(45) Date of Patent: Dec. 16, 2003

(54) PROGRAMMABLE SUBSCRIBER LOOP INTERFACE CIRCUIT AND METHOD

(76) Inventor: Christopher Ludeman, 911 Sunswept Rd. NE., Palm Bay, FL (US) 32905

( * ) Notice: Subject to any disclaimer, the term of this patent is extended or adjusted under 35 U.S.C. 154(b) by 0 days.

(21) Appl. No.: 09/145,182

(22) Filed: Sep. 1, 1998

(51) Int. Cl.[7] ............................ H04M 1/00; H04M 3/02
(52) U.S. Cl. ............ 379/399.01; 379/413; 379/399.02; 379/377; 379/418; 379/253; 379/412
(58) Field of Search .................................. 379/402, 382, 379/167, 399.01, 377, 413; 370/359

(56) References Cited

U.S. PATENT DOCUMENTS

| | | | | |
|---|---|---|---|---|
| 4,406,929 A | * | 9/1983 | Pace et al. ................... | 379/402 |
| 4,456,991 A | * | 6/1984 | Chea, Jr. et al. ............ | 370/359 |
| 5,881,142 A | * | 3/1999 | Frankel et al. ............... | 379/167 |
| 6,178,241 B1 | * | 1/2001 | Zhou .......................... | 379/382 |

* cited by examiner

Primary Examiner—Forester W. Isen
Assistant Examiner—Ramnandan Singh
(74) Attorney, Agent, or Firm—Duane Morris LLP

(57) ABSTRACT

A subscriber loop interface circuit and method for externally programming the on-hook, off-hook, and transition states of the subscriber loop interface circuit. The circuit having an off-hook overhead sufficient for long loop applications and having a continuous loop current to loop voltage relationship. The circuit may have plural means for generating reference currents for comparison with loop currents.

20 Claims, 6 Drawing Sheets

PROGRAMMABLE SUBSCRIBER LOOP INTERFACE CIRCUIT AND METHOD

BACKGROUND OF THE INVENTION

This invention relates to semiconductor subscriber loop interface circuits (SLIC's) and, more specifically, the invention relates to programmable subscriber loop interface circuits.

Telecommunications systems employ access products (e.g., subscriber interface units) for interfacing with each individual subscriber unit. An access product may include a SLIC for performing two to four wire conversion, battery feed, line supervision, and common mode rejection.

In a subscriber loop, the subscriber unit is generally powered from the SLIC through interface lines. Typically, subscriber loop interface lines are connected to the subscriber terminal pair of a SLIC. SLIC's are generally powered with a −48 V power supply and are backed up with a power supply of the same magnitude. Typically, the SLIC must deliver 3 to 5 volts DC to a subscriber unit (e.g., a telephone) for off-hook states and deliver −42.5 to −56 volts DC (i.e., open circuit voltage levels) for on-hook states.

In a voltage feed, current sensing, subscriber loop interface circuit, current in the loop is sensed and in response to the sensed current; voltage being applied to the subscriber terminals is varied. Sensed current may be referred to as loop current. Voltage applied across the subscriber terminals in response to loop current may be known as loop voltage. Typically, the range in values and the relationship between loop current and loop voltage is set internal to a semiconductor SLIC chip when the SLIC is manufactured.

Overhead voltage which may also be referred to as overload voltage are a range of voltage available for sudden voltage fluctuations. Typically, overhead is the voltage range between a saturation voltage and the loop voltage.

A problem in typical semiconductor SLIC chips may be the inability to provide adequate off-hook overhead for long loop length applications without needing a separate loop current to loop voltage relationship for off-hook and oh-hook conditions.

In typical prior art SLIC's, on-hook and off-hook conditions have separate states (i.e., separate loop current to loop voltage relationships). With reference to FIG. 1, over the range of loop: current $I_{loop}$, the on-hook loop voltage 12 is greater than the off-hook loop voltage 10. The off-hook loop voltage 10 decreases linearly over the range of loop current while the on-hook loop voltage 12 is constant for a period and then decreases linearly.

Linear decrease of loop voltage in relation to increasing loop current may be referred to as resistive feed. A constant loop current in relation to variation in loop voltage may be referred to as constant current feed. Typically, prior art SLIC's only provide either constant current feed or resistive feed.

In one SLIC design having constant current feed, the SLIC includes circuitry to prevent the voltage on the subscriber terminals from increasing above a saturation voltage. As the current drops in the line, the voltage transitions from the overload level for the off-hook state to the overload level for the on-hook state. In such a SLIC design, the saturation voltage may be set internally or externally to define overhead. The saturation voltage needs to be set so that overhead voltage on long loop application may be adequate for expected signal conditions. The saturation voltage level is typically set independent of the loop current limit setting $I_{Limit}$ by measuring loop voltage and comparing loop voltage to an on-chip reference value. The saturation voltage level may also be set by an internal or external resistor. Setting the saturation voltage closer to $V_{bat}$ decreases the on-hook signal capability of the SLIC. But increasing the on-hook signal capability may decrease the ability to achieve minimum on-hook open circuit requirements for some types of terminal equipment. In addition, setting the saturation voltage closer to $V_{bat}$ increase SLIC capability in supplying power to long loops.

With reference to FIG. 2, in one prior art technique, an increasing transition 20 occurs between an on-hook state 24 and an off-hook state 22. The transition occurs at a current $I_{sh}$ that may represent a switch hook detect threshold. In the off-hook state 22, loop voltage is generally adequate to power long loop length applications. In the on-hook state 24, voltage may be set during manufacturing to be farther away from $V_{bat}$ thus providing a broader range available for setting saturation voltage. A drawback of this technique is that there is instability around the transition because of the abrupt change.

With reference to FIG. 3, in another prior art technique, the TIP to ground voltage is kept substantially constant for loop current up to 6 mA, generally estimated to be the maximum line leakage in most systems. When the 6 mA current is exceeded, the overhead voltage magnitude rapidly increases to support speech and or teletax signal levels (see the vertical voltage decrease at the 6 mA threshold). In this technique, a virtual battery $V_{virbat}$ is used to define a virtual reference for resistive feed 31. Saturation voltage is not used because the off-hook voltage state of the SLIC are defined from the virtual battery and not from the loop voltage. Loop voltage in off-hook state is referenced to the virtual battery which increases the SLIC's ability to power long loops. In this technique, overhead voltage in the on-hook state is fixed on-chip and is not user programmable. The virtual battery and associated resistive feed slope may be set by one resistor. Another resistor may be required to set current limit. A drawback of this technique is that the switch detect threshold may not be set below 6 mA. Another drawback is that to increase the size of off-hook overhead, the SLIC must use resistive feed or use an external resistor $R_{oh}$ to offset the virtual battery curve. A further drawback is that if constant current feed is used, the overhead of the manufactured SLIC may not be increased, except by using the external resistor $R_{oh}$. Even external resistor $R_{oh}$ is used, on-hook overhead is not user programmable.

SUMMARY OF THE INVENTION

Accordingly, it is an object of the present invention to provide a novel SLIC that overcomes the drawbacks of the known prior art.

It is another object of the present invention to provide a novel method of powering a subscriber loop.

It is yet another object of the present invention to provide a novel SLIC having user programmable parameters allowing a user to program the SLIC to meet varying requirements.

It is still another object of the present invention to provide a novel voltage feed, current sense SLIC which provides adequate overhead voltage without relying on the digital transition signal between separate on-hook and off-hook states.

It is a further object of the present invention to provide a novel SLIC having means external to SLIC for selecting SLIC operating parameters.

It is yet a further object of the present invention to provide a novel SLIC having means external to the SLIC for programming switch hook detect threshold, current limit, and overhead voltage(s).

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
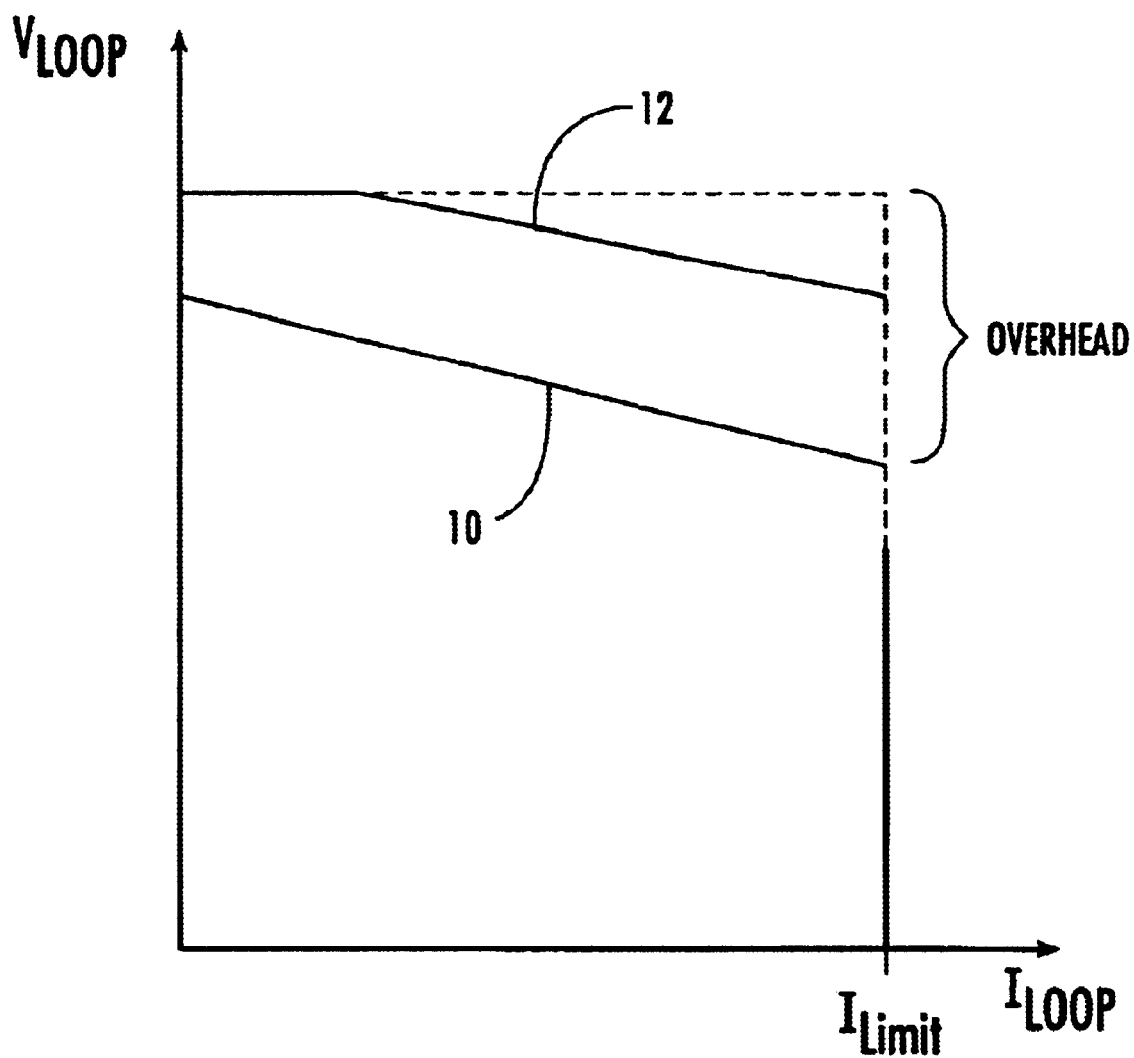
FIG. 1 is a graph illustrating loop current to loop voltage relationship in a first prior art SLIC.
Figure 2:
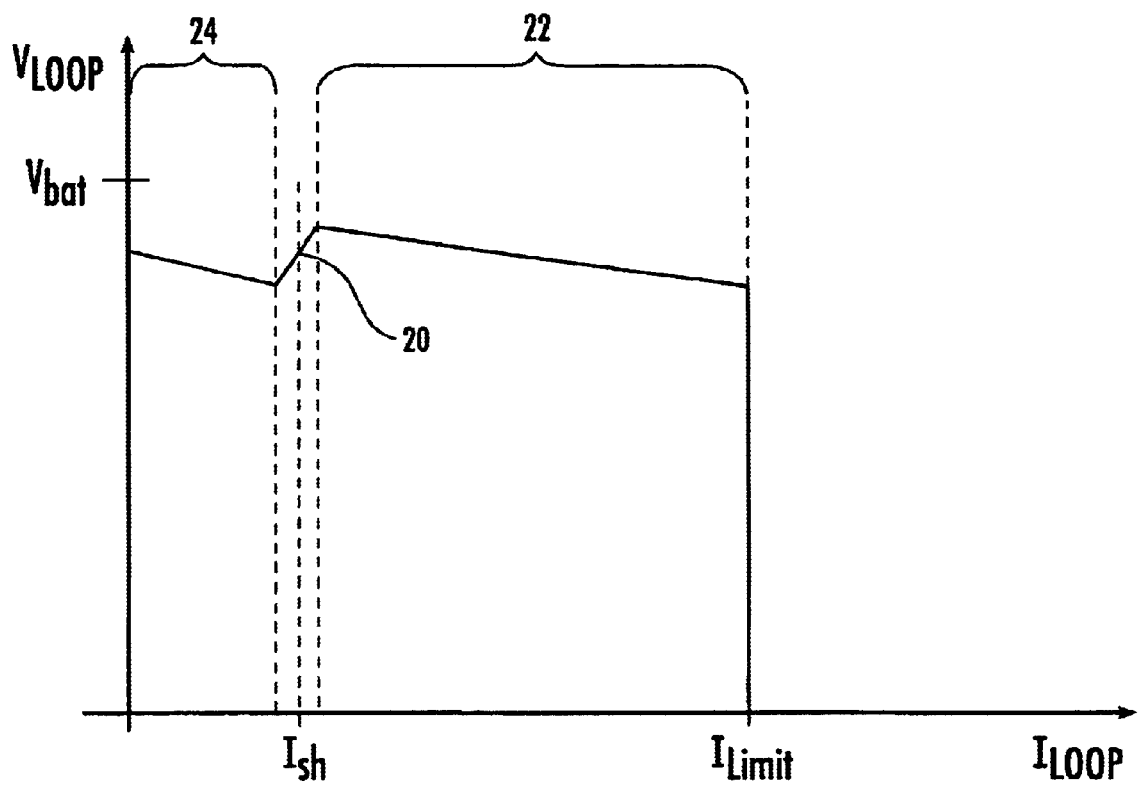
FIG. 2 is a graph illustrating loop current to loop voltage relationship in a second prior art SLIC having an off-hook state which is not separate from an on-hook state.
Figure 3:
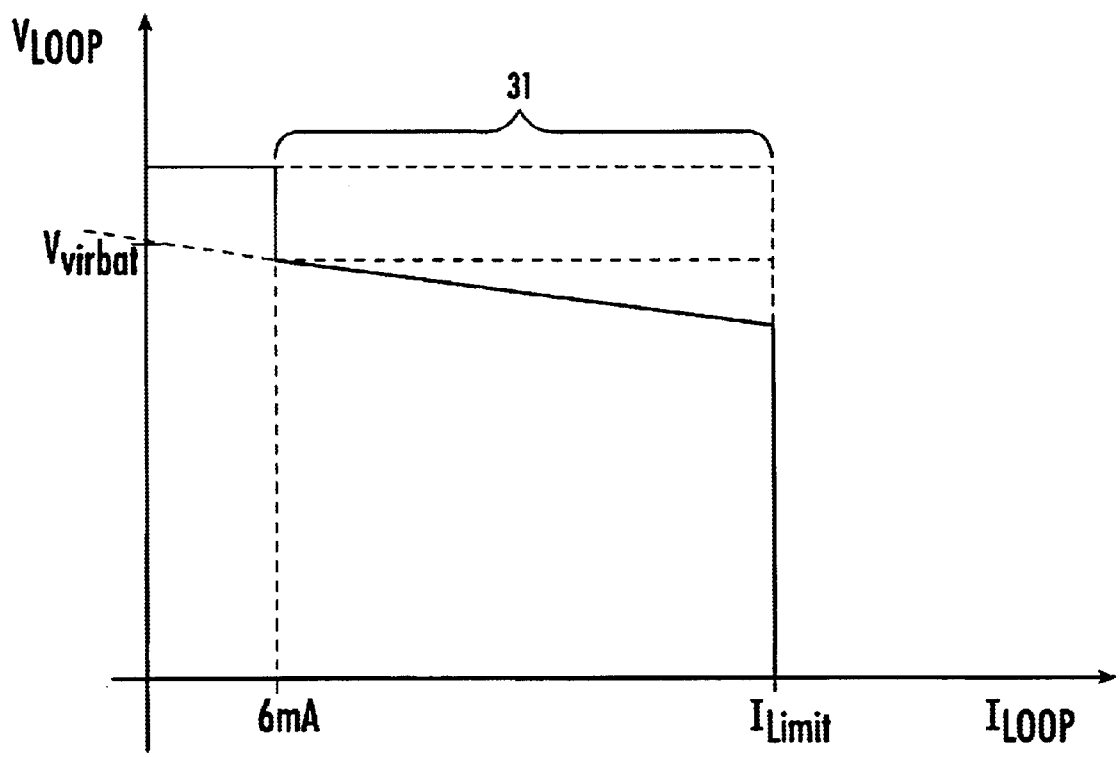
FIG. 3 is a graph illustrating subscriber loop current to voltage relationship for a prior art SLIC having a virtual battery.
Figure 4:
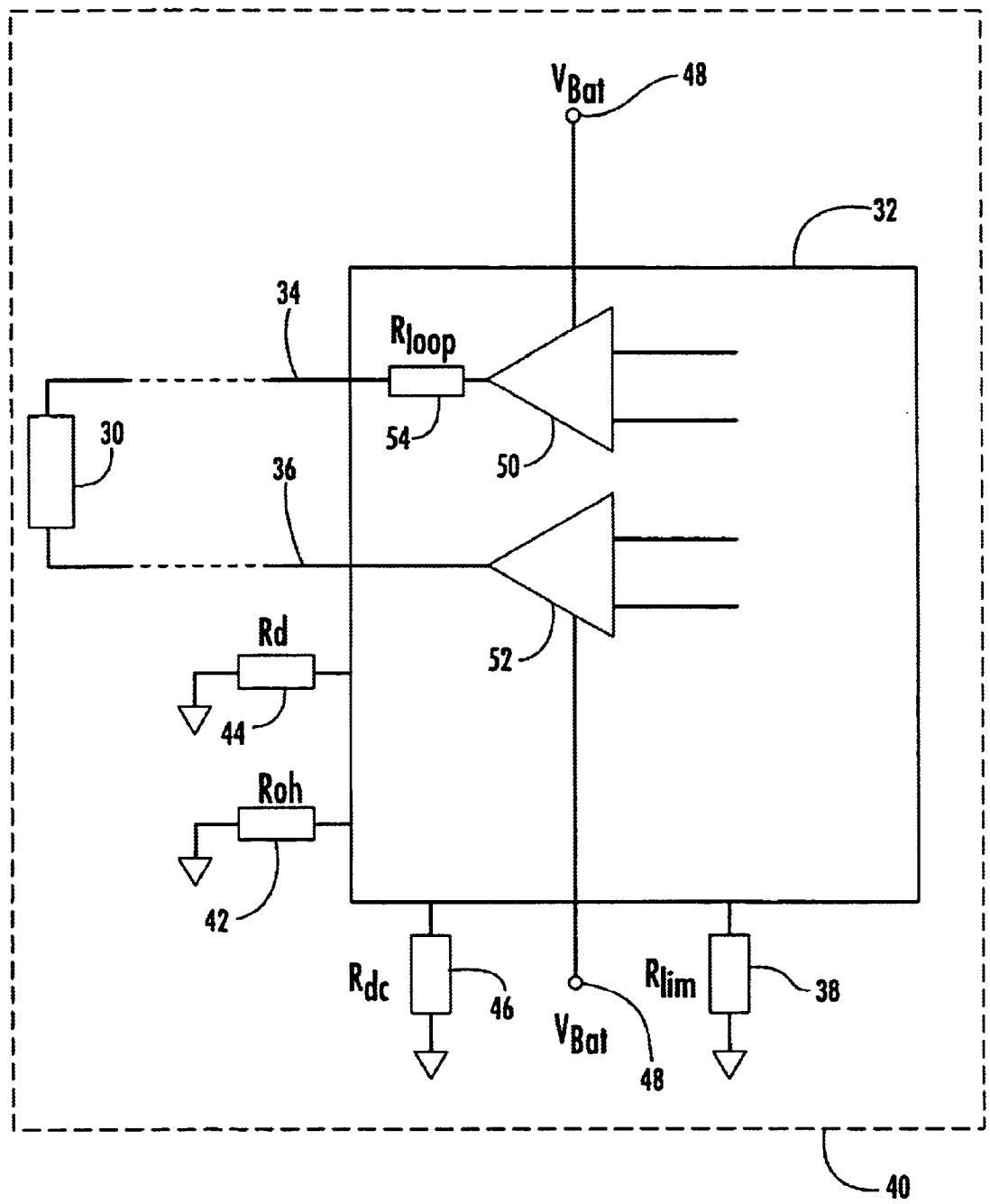
FIG. 4 is a functional block diagram of a subscriber loop circuit of a first embodiment of the present invention.

With reference with FIG. 4, a subscriber loop circuit 40 may include a subscriber unit 30, a subscriber loop interface circuit 32, a resistive element $R_d$ 44, a resistive element $R_{oh}$ 42, a resistive element $R_{dc}$ 46, a resistive element $R_{lim}$ 38, battery supply $V_{bat}$ 48 and a pair of subscriber lines 34 and 36. The SLIC 32 may include a resistive element $R_{loop}$ 54 and a pair of amplifiers 50 and 52.

In operation, resistive element $R_{loop}$ 54 may be used to sense current flowing in one of the subscriber lines 34. The amplifiers 50 and 52 typically known as the TIP and RING amplifiers may supply power to the subscriber lines as a function of the loop current. Resistive element $R_d$ may set the switch hook detect threshold of the SLIC 32. Resistive element $R_{lim}$ may set the current limit of the SLIC 32. Resistive element $R_{dc}$ may set the slope of a resistive feed during voltage transition between on-hook and off-hook states. Resistive element $R_{oh}$ may set off-hook overhead. Preferably, $R_{lim}$, $R_d$, $R_{oh}$, and $R_{dc}$ are selected to independently set the current limit, overhead, resistive feed, and switch hook detect threshold.

Figure 5:
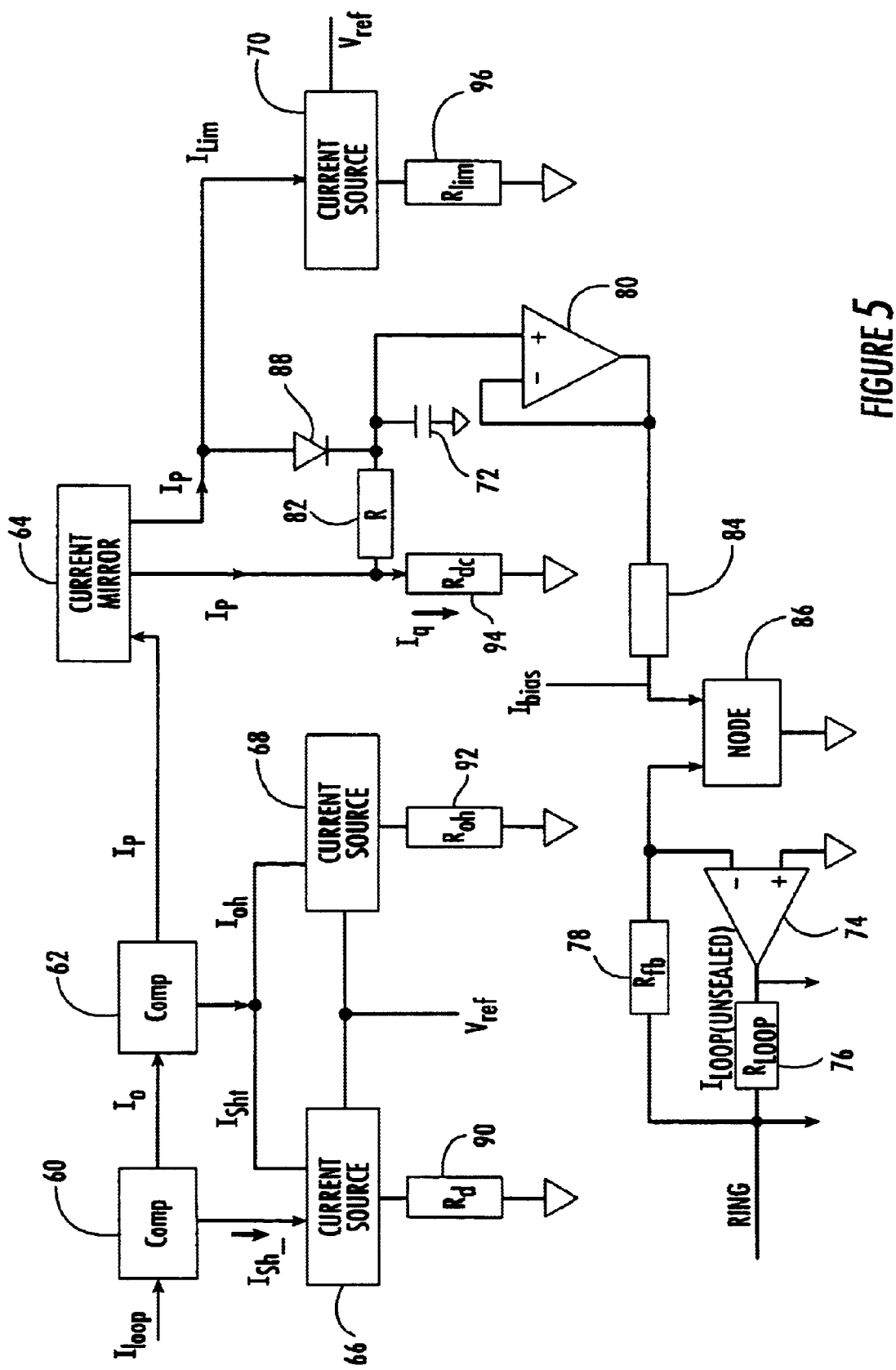
FIG. 5 is a functional block diagram of a portion of a SLIC with external circuitry of a second embodiment of the present invention.

With reference to FIG. 5, a SLIC may include a first current comparator 60, a second current comparator 62, a current mirror 64, three current sources 66, 68, and 70, a subscriber line amplifier 74, a current sensing resistive element $R_{loop}$ 76, a feedback resistive element $R_{fb}$ 78, a non-inverting buffer 80, a high impedance element R 82, a current setting resistive element 84, a current summing node 86, and diode 88. The SLIC may include a set of terminals for connecting to external to SLIC resistance elements $R_d$ 90, $R_{oh}$ 92, $R_{dc}$ 94, and $R_{lim}$ 96 and external to SLIC capacitor 72. Preferably the resistance of the external to SLIC resistance elements $R_d$ 90, $R_{oh}$ 92, $R_{dc}$ 94, and $R_{lim}$ 96 are set by a user when installed.

In operation, loop current may be determined by measuring voltage across $R_{loop}$ 76 (e.g., a 20 ohm resistor). Loop current may also be determined by measuring voltage across resistors in series with both TIP and RING amplifiers. When using current sensing resistors in series with both TIP and RING amplifiers, longitudinal currents may be rejected by inversion and addition of measured currents to each other. A scaled version of the loop current may be generated by a current source using the measured voltage and an internal resistive element. The scaled loop current may be 1/1000 of the loop current. In describing internal SLIC operation, loop currents refer to the scaled loop current. For example, a switch hook detect reference current internal to a SLIC refers to a scaled switch hook detect reference current.

Resistive element $R_d$ 90 may be used to set the switch hook detect threshold $I_{sh}$ of the SLIC. The current source 66 may be controlled by resistive element $R_d$ 90 to generate a lower switch hook detect reference current $I_{sh-}$ and an upper switch hook detect reference current $I_{sh+}$. Alternatively, $I_{sh-}$ and $I_{sh+}$ may be generated by first generating a switch hook detect threshold current $I_{sh}$ and scaling the switch hook detect threshold current to provide $I_{sh-}$ and $I_{sh+}$. First comparator 60 may compare loop current $I_{loop}$ with $I_{sh-}$ and provide an output current $I_o$ where:

$$I_o = I_{sh-} \text{ if } I_{loop} < I_{sh-},$$

or $$I_o = I_{loop} \text{ if } I_{loop} > I_{sh-}.$$

The current source 68 may be controlled by external resistive element $R_{oh}$ to generate a current $I_{oh}$. $R_{oh}$ may be used to increase or decrease the off-hook overhead by increasing the voltage range between the loop voltage and the difference between the battery voltage and a fixed minimum voltage needed for SLIC requirements. Increasing the range enables larger signal swings on the TIP and Ring terminals of the SLIC. For simplicity, $R_{oh}$ is assumed to have infinite resistance.

The second comparator 62 may compare $I_o$ with the sum of $I_{sh+}$ and $I_{oh}$. The current $I_{oh}$ generated as a function of $R_{oh}$ may also be summed with a reference current other than $I_{sh-}$ such as $I_{sh+}$, $I_{sh}$, zero, or some other current that may generated as a reference. The sum of $I_{oh}$ and a second reference generates an off-hook reference current which may be the minimum current threshold for off-hook loop currents. If $I_o < I_{sh+}$ (or $I_{sh+} + I_{oh}$ if $I_{oh}$ is not zero) then the output of the second comparator may be $I_p = I_o$. If $I_o > I_{sh+}$ then the output of the second comparator may $I_p = I_{sh+}$ (or $I_{sh+} + I_{oh}$ is not zero).

Current mirror 64 receives $I_p$ and generates two copies of $I_p$. Current source 70 may be controlled by resistive element $R_{lim}$ 96 to generate a current limit $I_{lim}$. If $I_p$ exceeds $I_{lim}$, then the current $I_p - I_{lim}$ flows through diode 88 to a high impedance element R 82. The high impedance element R 82 may be selected to be much larger than $R_{dc}$ 94 so that the current flowing through diode 88 dominates current flowing into the non-inverting buffer 80. If $I_p$ is less than $I_{lim}$, then current $I_q$ drops across an external resistive element $R_{dc}$. The voltage across $R_{dc}$ is buffered by amplifier 80, converted to a current by resistor 84, and passed to an internal current summing node 86. If the $I_{oh}$ reference current is greater than $I_{limit}$, the SLIC is in resistive feed between the on-hook state and the current limit $I_{limit}$.

If $I_q = 0$ (i.e., an open circuit across the subscriber terminals), then current $I_{bias}$ may set the output of amplifier 74 to be at battery potential $V_{bat}$. Any non-zero value of $I_q$ will move the amplifier voltage closer to ground and thereby increase overhead voltage.

If $I_p > I_{lim}$, the difference between $I_p$ and $I_{lim}$ flows through R 82 and $R_{dc}$ which being much greater than $R_{dc}$ alone results in a much greater change in loop voltage at the output of amplifier 80. Therefore, the feedback current of amplifier 74 may be increased by the high impedance of R 82 since the resistive value of $R_{dc}$ is generally not high enough to control loop current to a constant value during current limiting. External capacitor 72 may be connected to the SLIC to prevent high gain from generating noise or oscillations.

Amplifier 74 is one of a pair of subscriber line amplifiers, (e.g., the RING line amplifier). Other embodiments may include circuitry as in FIG. 5 associated with each subscriber line amplifier.

Figure 6:
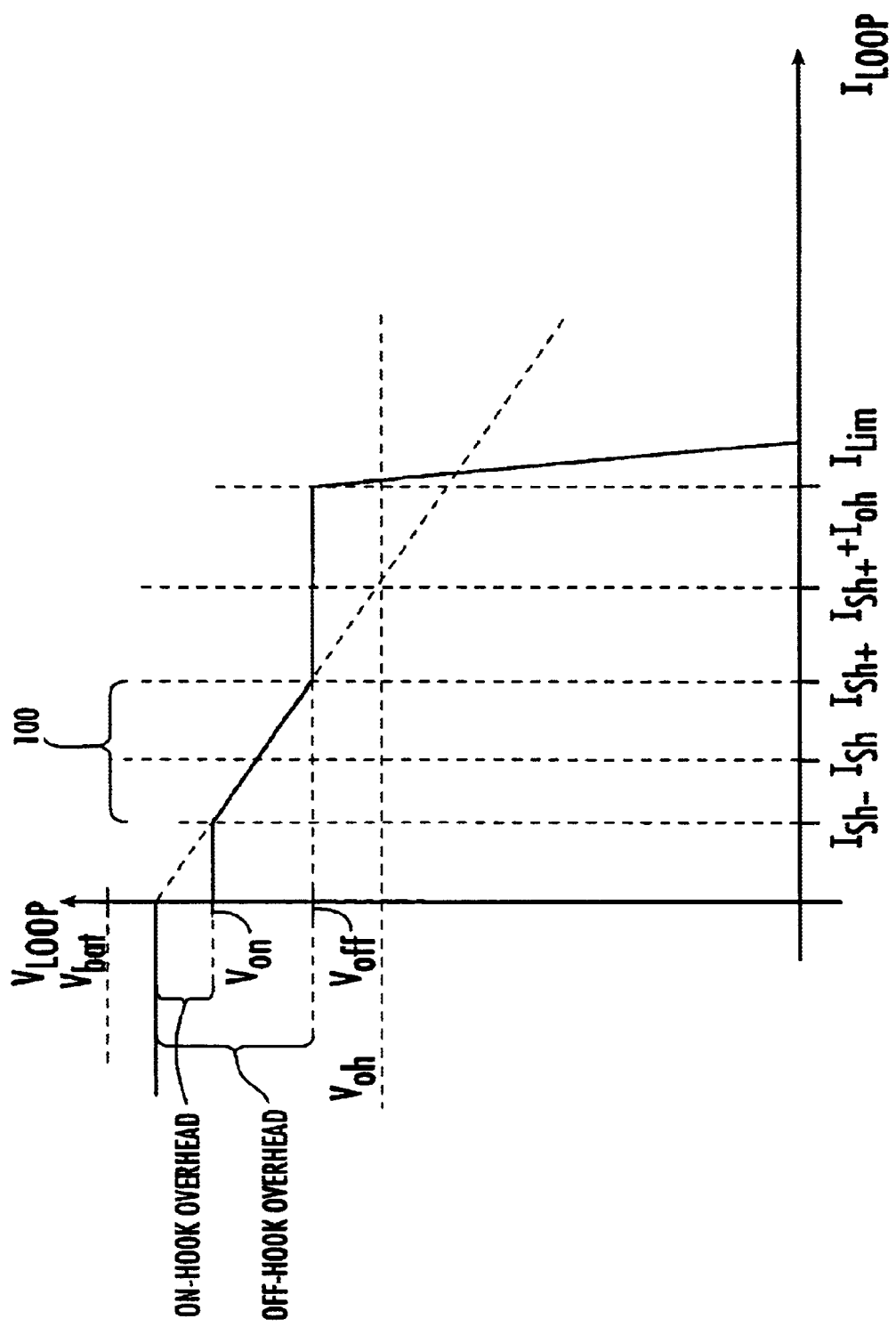
FIG. 6 is a graph illustrating a loop current to loop voltage relationship for the first or second embodiment of the present invention.

With reference to FIG. 6, the switch hook detect threshold $I_{sh}$ may be programmed by a user using an external resistive element $R_d$. A switch hook detect threshold window 100 may be user programmed by scaling $I_{sh}$ to provide an upper and lower window bounds, or by scaling $I_{sh}$ to provide a lower window bound and adding $I_{oh}$ to predetermined reference current to provide an upper window bound. When loop current is in the threshold window 100, loop voltage is in resistive feed with a slope determined by external resistive element $R_{dc}$. When loop current is below the threshold window, the SLIC is in an on-hook state providing constant loop voltage $V_{on}$. The maximum value of $V_{on}$ may be $V_{bat}$ minus a fixed voltage value needed for SLIC requirements. The on-hook and off-hook overheads are both referenced to the battery, $V_{bat}$, minus the fixed voltage value needed for SLIC requirements. When loop current is above the switch hook detect threshold window, the SLIC is in an off-hook state providing a constant voltage $V_{off}$. Alternatively, constant voltage in the off-hook state may be $V_{oh}$ which may be selected using external resistor $R_{oh}$ (for generating $I_{oh}$) and a reference current such as $I_{sh+}$. The voltage in the off-hook state may not be constant (e.g., it may be in a resistive feed mode) if $I_{oh}$ plus a reference current is greater than $I_{limit}$ (e.g., $V_{oh}$ may be set to a level at which the slope of the resistive feed intersects the current limit $I_{limit}$) The current limit $I_{limit}$ may be set with external resistor $R_{lim}$ and may have a slight slope.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. In a voltage feed, current sense, subscriber loop interface circuit having a pair of subscriber terminals and current sensing means for sensing current flowing through one of said terminals, the improvement comprising:
   (a) first generating means for generating a switch hook detect reference current as a function of a first resistance;
   (b) second generating means for generating upper and lower reference currents by scaling the switch hook detect reference current;
   (c) third generating means for generating a variable control current as a function of an internal reference voltage, a second resistance, and the sensed current; and
   (d) voltage control means responsive to the current sensing means for applying a voltage across said terminals, said voltage being continuous over a range of sensed current,
      (i) a first voltage level being applied to indicate an on-hook condition when the sensed current is below the lower reference current,
      (ii) a second voltage level being applied to indicate an off-hook condition when the sensed current is above the upper reference current, and
      (iii) a first variable voltage level being applied as a function of the control current when the sensed current is in between and including the upper and lower reference currents.

2. The subscriber loop interface circuit of claim 1 further comprising:
   fourth generating means for generating a current limit reference current as a function of a third resistance; and
   wherein said voltage control means applies a second variable voltage level across said terminals, the second variable voltage level varying as a function of the greater than or less than zero difference between the sensed current and the current limit reference current, to thereby hold the sensed current approximately equal to zero.

3. The subscriber loop interface circuit of claim 1 wherein as sensed current increases, the first variable voltage level being applied decreases linearly at rate equal to the second resistance.

4. In a voltage feed, current sense, subscriber loop interface circuit having a pair of subscriber terminals and current sensing means for sensing current flowing through one of the terminals, a method of supplying power to the subscriber terminals as a function of the sensed current comprising the steps of:
   (a) generating a switch hook detect reference current as a function of a first resistance;
   (b) generating upper and lower reference currents by scaling the switch hook detect reference current;
   (c) generating a variable control current as a function of a second resistance and the sensed current; and
   (d) in response to the sensed current, applying a voltage across the terminals, the voltage being continuous over a range of sensed current,
      (i) applying a first voltage across the terminals to indicate an on-hook condition when the sensed current is below the lower reference current,
      (ii) applying a second voltage across the terminals to indicate an off-hook condition when the sensed current is above the upper reference current, and
      (iii) applying a first variable voltage across the terminals as a function of the control current when the current sensed is in between and including the upper and lower reference currents.

5. The method of claim 4 further comprising the step of:
   (e) generating a current limit reference current as a function of a third resistance; and
   (f) applying a second variable voltage across the terminals, the second variable voltage varying as a function of the greater than or less than zero difference between the sensed current and the current limit reference current, to thereby hold the sensed current approximately equal to zero.

6. The method of claim 4 wherein the variable voltage being applied decreases linearly at rate equal to the second resistance.

7. The method of claim 4 further comprising the step of: comparing the sensed current to the lower reference current.

8. In a voltage feed, current sense, subscriber loop interface circuit having a pair of subscriber terminals and current sensing means for sensing current flowing through one of said terminals, the improvement comprising:

(a) first generating means for generating a switch hook detect reference current as a function of a first resistance;

(b) second generating means for generating a lower reference current by scaling the switch hook detect reference current;

(c) third generating means for generating a variable control current as a function of a second resistance and the sensed current;

(d) fourth generating means for generating an off-hook reference current as a function of a third resistance; and (e) voltage control means responsive to the current sensing means for applying a voltage across said terminals, said voltage being continuous over a range of sensed current, (i) a first voltage level being applied to indicate an on-hook condition when the sensed current is below the lower reference current, (ii) a second voltage level being applied to indicate an off-hook condition when the sensed current is above the off-hook reference current, and (iii) a first variable voltage level being applied as a function of the control current when the current sensed is in between and including the lower reference current and the off-hook reference current.

9. The subscriber loop interface circuit of claim 8 wherein said voltage control means includes:

voltage generating means for generating an offset voltage as a function of the control current and for generating a first variable voltage level by subtracting the offset voltage from a battery voltage.

10. The subscriber loop interface circuit of claim 8 wherein said fourth generating means generates an off-hook reference current by:

(i) generating a raw off-hook reference current as a function of a third resistance, and (ii) adding the raw off-hook reference to a predetermined current to generate the off-hook reference current, the predetermined current being a current from the group of switch hook detect reference current and lower reference current.

11. The subscriber loop interface circuit of claim 8 wherein:

said second generating means includes means for generating an upper reference current by scaling the switch hook detect reference current; and said fourth generating means generates an off-hook reference current by:

(i) generating a raw off-hook reference current as a function of a third resistance, and (ii) adding the raw off-hook reference to a predetermined current to generate the off-hook reference current, the predetermined current being a current from the group of switch hook detect reference current, lower reference current, and upper reference current.

12. The subscriber loop interface circuit of claim 8 further comprising:

fifth generating means for generating a current limit reference current as a function of a fourth resistance; and wherein said voltage control means applies a second variable voltage level across said terminals, the second variable voltage level varying as a function of the greater than or less than zero difference between the sensed current and the current limit reference current, to thereby hold the sensed current approximately equal to zero.

13. In a voltage feed, current sense, subscriber loop interface circuit having a pair of subscriber terminals and current sensing means for sensing current flowing through one of the terminals, a method of supplying power to the subscriber terminals as a function of the sensed current comprising the steps of:

(a) generating a switch hook detect reference current as a function of a first resistance;

(b) generating a lower reference current by scaling the switch hook detect reference current;

(c) generating a variable control current as a function of a second resistance and the sensed current;

(d) generating an off-hook reference current as a function of a third resistance; and (e) in response to the sensed current, applying a voltage across the terminals, said voltage being continuous over a range of sensed current, (i) a first voltage level being applied to indicate an on-hook condition when the sensed current is below the lower reference current, (ii) a second voltage level being applied to indicate an off-hook condition when the sensed current is above the off-hook reference current, and (iii) a first variable voltage level being applied as a function of the control current when the current sensed is in between and including the lower reference current and the off-hook reference current.

14. The method claim 13 wherein said step of generating an off-hook reference current includes the steps of:

(i) generating a raw off-hook reference current as a function of a third resistance, and (ii) adding the raw off-hook reference to a predetermined current to generate the off-hook reference current, the predetermined current being a current from the group of switch hook detect reference current and lower reference current.

15. The method of claim 13 further including the step of:

(f) generating an upper reference current by scaling the switch hook detect reference current; and wherein the step of generating an off-hook reference current includes the steps of:

(i) generating a raw off-hook reference current as a function of a third resistance, and (ii) adding the raw off-hook reference to a predetermined current to generate the off-hook reference current, the predetermined current being a current from the group of switch hook detect reference current, lower reference current, and upper reference current.

16. The method of claim 13 further comprising the step of:

(f) generating a current limit reference current as a function of a fourth resistance; and (g) applying a second variable voltage across the terminals, the second variable voltage varying as a function of the greater than or less than zero difference between the sensed current and the current limit reference current, to thereby hold the sensed current approximately equal to zero.

17. In an integrated circuit voltage feed, current sense, subscriber loop interface circuit having (i) a pair of subscriber terminals, (ii) current sensing means for sensing current flowing through at least one of said subscriber terminals, and (iii) voltage feed means for supplying an off-hook voltage potential, an on-hook voltage potential, and voltage potential transition between the on-hook and off-hook voltage potentials across said pair of subscriber terminals, the improvement comprising means external to the integrated circuit for programming the off-hook voltage potential, the on-hook voltage potential, and voltage potential transition between the on-hook and off-hook voltage potentials of the subscriber loop interface circuit.

18. The integrated circuit of claim 17 wherein said means external to the integrated circuit includes:
   a first resistive element for programming a switch hook detect threshold current of the subscriber loop interface circuit.

19. The integrated circuit of claim 17 wherein said means external to the integrated circuit includes:

a second resistive element for programming a variable voltage potential transition between the on-hook and off-hook voltage potentials.

20. An integrated circuit subscriber loop interface circuit comprising:

means for sensing a first signal characteristic of a loop signal; and means external to the integrated circuit for defining a relationship between the first signal characteristic and a second signal characteristic of the loop signal to indicate an on-hook state, an off-hook state, and a transition state of the subscriber loop interface circuit.

* * * * *